United States Patent [19]

Volk et al.

[11] Patent Number: 4,792,950
[45] Date of Patent: Dec. 20, 1988

[54] MULTIPLEX WIRING SYSTEM

[75] Inventors: Jack R. Volk, Ann Arbor; Alan J. Duszkiewicz, Livonia, both of Mich.

[73] Assignee: Ford Motor Company, Dearborn, Mich.

[21] Appl. No.: 63,333

[22] Filed: Jun. 17, 1987

[51] Int. Cl.[4] ............................................. G06F 11/20
[52] U.S. Cl. .................................... 371/8; 340/825.03
[58] Field of Search ............................ 371/68, 70, 8; 340/825.01, 825.03, 827, 825.04, 825.16, 52 F

[56] References Cited

U.S. PATENT DOCUMENTS

| 3,651,454 | 3/1972 | Venema et al. | 340/52 F |
| 3,891,965 | 6/1975 | Schroeder | 340/52 F |
| 3,934,131 | 1/1976 | Perschy | 371/70 |
| 4,070,648 | 1/1978 | Merganthaler et al. | 371/70 |
| 4,241,444 | 12/1980 | Kister | 370/85 |
| 4,245,344 | 1/1981 | Richter | 371/68 |
| 4,406,007 | 9/1983 | Kister et al. | 370/85 |

Primary Examiner—Charles E. Atkinson
Attorney, Agent, or Firm—Allan J. Lippa; Peter Abolins

[57] ABSTRACT

A multiplex wiring system having a plurality of communication modules which are interconnected on a pair of buses. Data is transmitted from any one of the modules on one of the buses while redundant or complementary data is transmitted on the other bus. Each module includes three receiving channels, one channel for receiving data, one channel for receiving complementary data, and a differential channel for differentially combining the data and complementary data thereby reducing received noise. A predetermined data sequence is detected on each of the three channels such that specific types of system faults are indicated. In response to the fault indication, the most suitable of the three channels is selected to receive data.

11 Claims, 4 Drawing Sheets

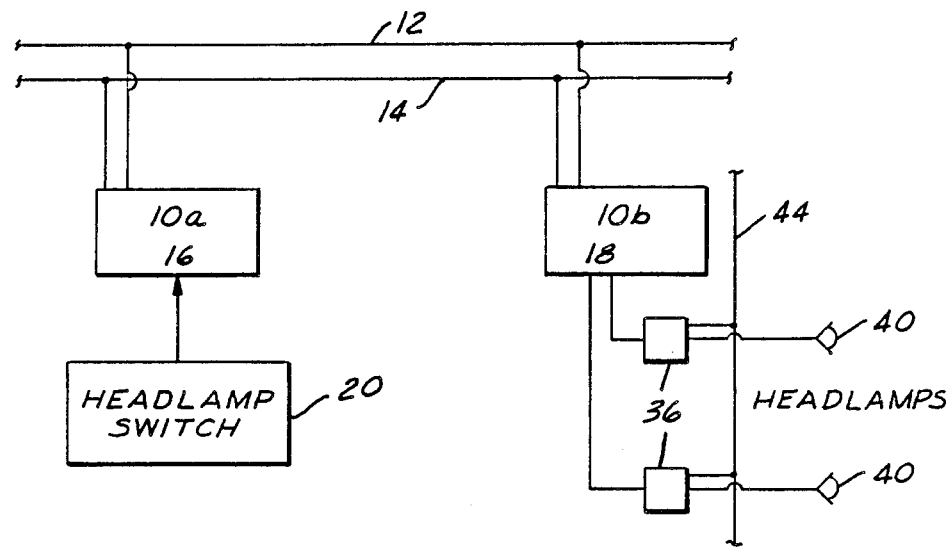

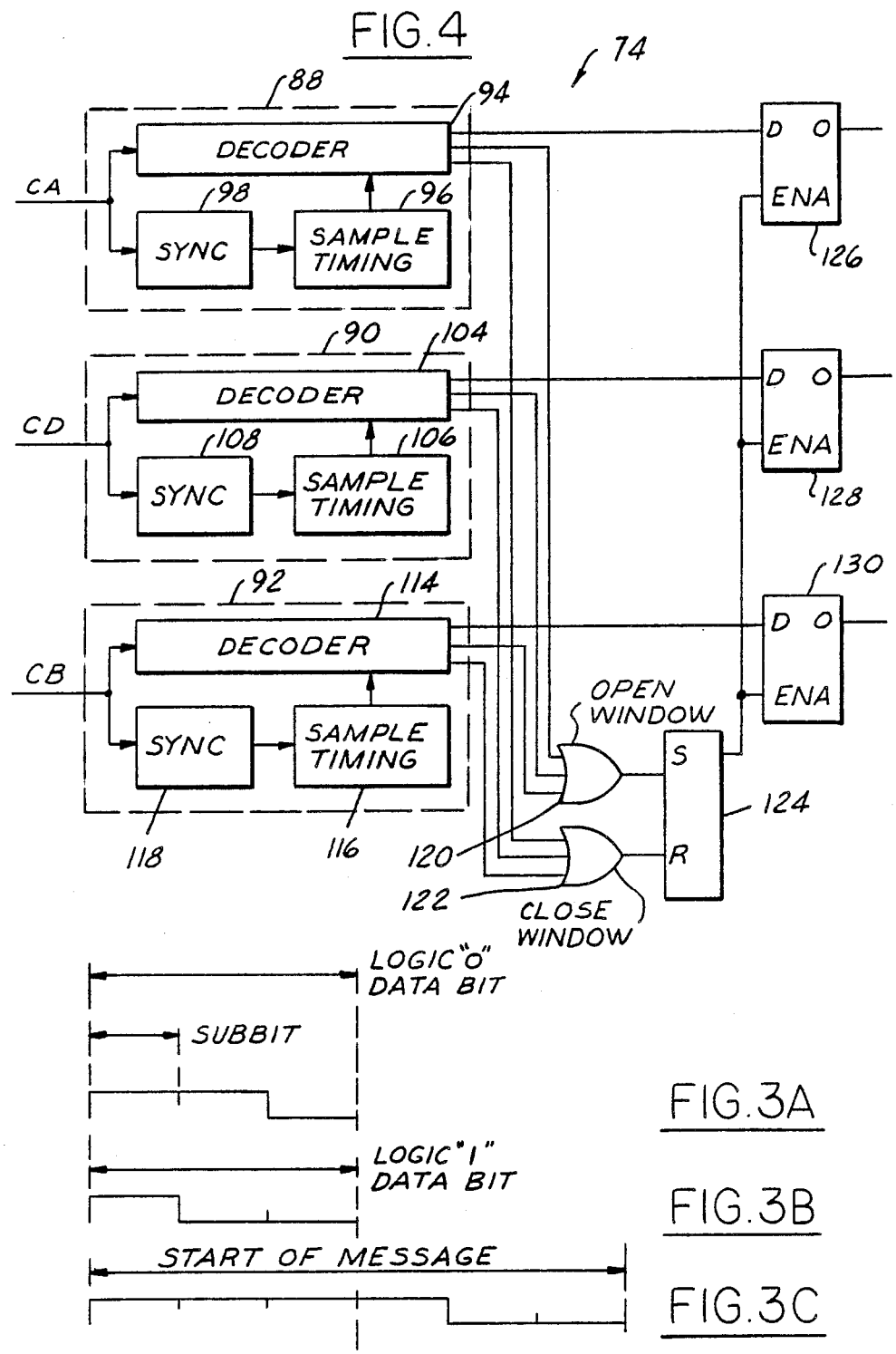

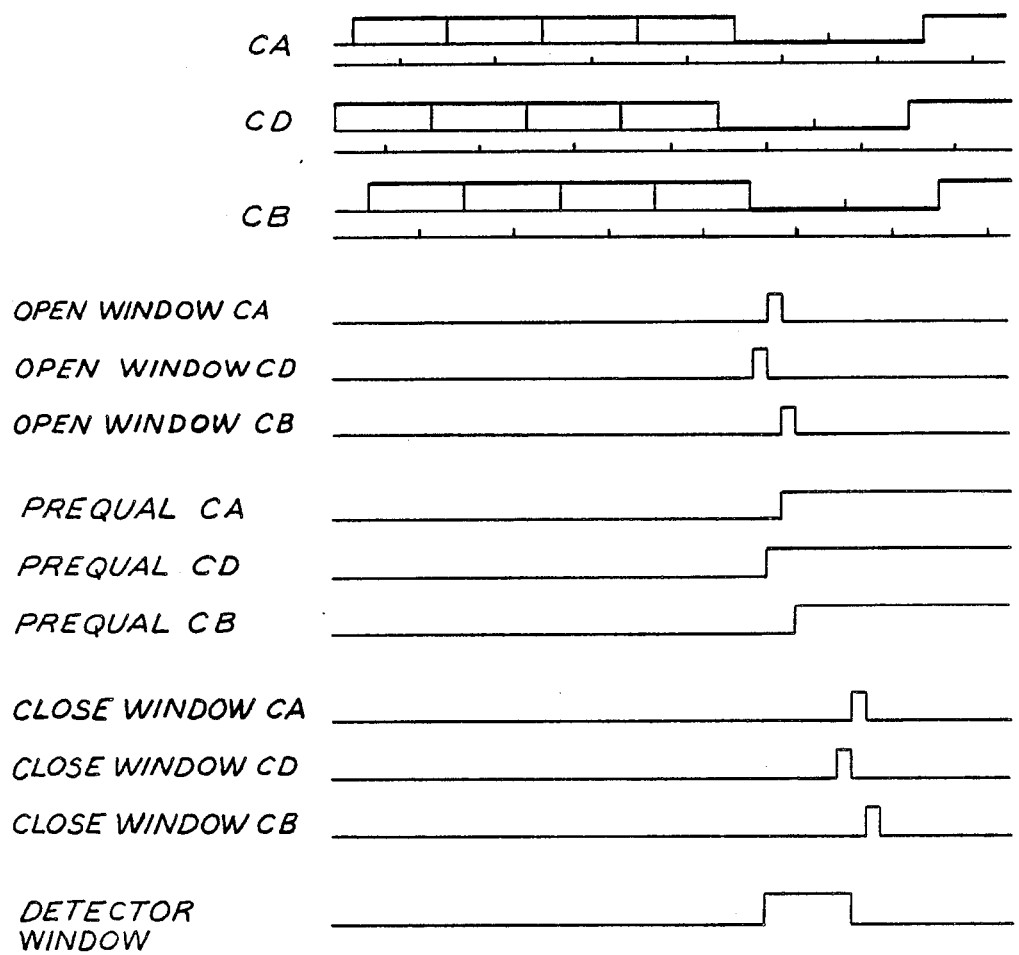

MULTIPLEX WIRING SYSTEM

BACKGROUND OF THE INVENTION

The invention relates to a multiplex wiring system.

Multiplex wiring systems for automobiles are known for reducing the large number of wires required to link automobile accessories with the appropriate accessory switch and to link automobile displays with the appropriate automobile sensor. In general terms, each accessory switch and each sensor are coupled via appropriate transmitters to a data bus line. Similarly, each accessory and each display or other receivers of sensor information such as, for example, control processors are coupled via appropriate receivers to the same bus line.

Multiplex wiring systems are known wherein a transmitting node serially transmits data on a data bus to which a plurality of receiving nodes are connected. The serial stream of transmitted data typically includes: a start-of-message, an address for a particular receiving node, and instruction data. Each receiving node detects the start-of-message for actuating the appropriate receiving circuitry. Only the designated receiving node recognizes its own address and then acts upon the instruction data following the address data. An example of such a system is disclosed in U.S. Pat. No. 3,651,454 issued to Venema et al.

A problem with these systems has been that a failure in the data bus may disable a large portion of the automobile's electronic circuitry. An additional problem is that the failure may be difficult to diagnose and correct. A further problem is that noise on the data bus may be misinterpreted as data resulting in a temporary and unpredictable failure of the automobile's electronic system.

U.S. Pat. No. 3,891,965 discloses a different type of multiplex system wherein the address information is sent over a multitude of parallel address lines which are physically separated from the data buses. Complementary address codes are assigned to each sender/receiver set so that, in the event of a failure on one address line, the receiving set may still recognize its own address. Two parallel data buses, carrying identical data, are also disclosed. The data bus lines are tied together by isolation diodes. In the event that one of the data buses becomes shorted to the automobile ground, the isolation diode will isolate that particular bus from the receiving node. This system, however, does not appear to teach any method for recognizing, or protecting against, other forms of failure in the data bus such as a short to power or an open circuit condition.

The need still remains for a multiplex wiring system which will continue to operate during a wide range of failures in the data bus such as when the data bus is shorted to power, shorted to ground, or open circuited. A need also remains for providing comprehensive information about the type of faults on the data bus. Further, a need remains for rejecting noise on the data bus which may be misinterpreted as data.

SUMMARY OF THE INVENTION

It is an object of the present invention to provide a multiplex wiring system having a higher degree of reliability and maintainability than heretofore possible.

The invention provides the advantages of continued operation during numerous types of system failures, indication designating the specific type of failure, indications of the location of system failures, and substantial noise immunity.

In one aspect of the invention, the object and advantages described above and others are obtained by a multiplex wiring system comprising: transmitting means for transmitting data on a first bus and for transmitting complementary data on a second bus, the complementary data being the complement of the data transmitted on the first bus; first receiver means coupled to the first bus; second receiver means coupled to the second bus; differential receiver means coupled to both buses for combining the data and the complementary data thereby achieving substantial noise immunity; detector means for detecting a predetermined data sequence, preferably a start-of-message, in each of the receiver means; decoder means coupled to the detector means for providing an indication of a fault, preferably including the type of fault and the location of the fault; and data selector means responsive to the decoder means for selecting data from one of the receivers based upon the fault indication.

DESCRIPTION OF THE DRAWINGS

FIG. 2 is a block diagram illustrating two modules coupled to a corresponding accessory switch and accessories in a multiplex wiring system for an automobile.

FIG. 3A is a graphical representation of a data bit shown including a plurality of subbits.

FIG. 3B is a graphical representation of another data bit shown including a plurality of subbits.

FIG. 3C is a graphical representation of the start-of-message shown including a plurality of subbits.

FIG. 4 is a block diagram of a portion of FIG. 1.

FIG. 5 illustrates the wave forms associated with detecting the start-of-message in each of the three receivers at a receiving module.

DESCRIPTION OF THE PREFERRED EMBODIMENT

Figure 1:
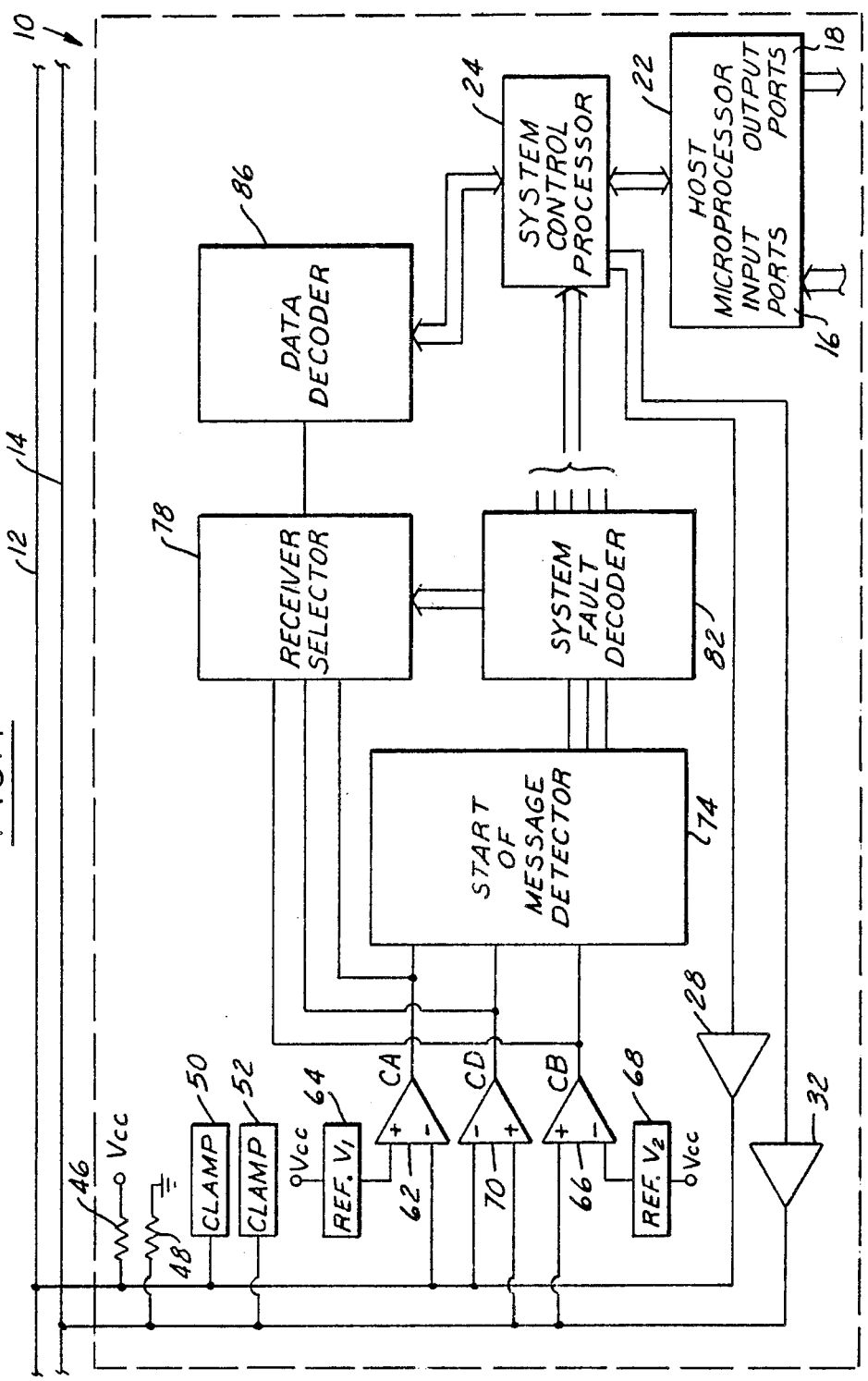
FIG. 1 is a block diagram of a combined transmitting and receiving module shown coupled to the information bus of the multiplex wiring system.

Referring first to FIG. 1, a block diagram of an embodiment of one communication module 10 is shown. It should be understood that the multiplex wiring system includes many identical communication modules which transmit and receive information from one another on information bus line 12 and information bus line 14. Two bus lines are provided for redundancy wherein any one of the two bus lines may be used for both transmitting and receiving information between the modules. Stated another way, bus line 14 carries data which is complementary to the data carried on bus line 12. As described in greater detail hereinafter, in the event of the failure in one of the bus lines, module 10 will select the other bus line.

Each module is also coupled to information sources, such as accessory switches or automobile sensors, through input ports 16. Corresponding receptive devices, such as automobile accessories or automobile displays or on-board computers, are coupled to output ports 18. A common power bus 44 is also provided in the multiplex wiring system (FIG. 2).

Before describing module 10 in detail, it will be helpful to briefly describe the system in which module 10 operates. An illustrative example of operation is presented in FIG. 2 wherein like numerals refer to like parts shown in FIG. 1. Headlamp switch 20 is here shown coupled to module 10a via input port 16. In response to actuation of headlamp switch 20, host microprocessor 22 (FIG. 1) of module 10a generates an appropriate turn-on headlamp command. System control processor 24 (FIG. 1) of module 10a then transforms the command into serial data or a binary word including a start-of-message, an address which is recognizable by appropriate receiving module 10b, and instruction data. The data and complement of the data from system control processor 24 is transmitted by respective drivers 28 and 32 (FIG. 1) onto respective bus lines 12 and 14.

Each module 10 receives the data from bus lines 12 and 14. If the system is operating properly, each module 10 detects the start of message as described in greater detail hereinafter. However, only the appropriate receiving module 10b recognizes its own address and initiates actuation of headlamps 40 in response to the appropiate instruction. Preferably, headlamp actuation is accomplished via power relay 36 which couples headlamps 40 to power bus 44 in response to a signal from output port 18 of receiving module 10b.

Referring back to FIG. 1, a detailed description of module 10 is now given. Bus lines 12 and 14, preferably comprising a twisted wire pair, carry complementary data. That is, bus lines 12 and 14 are differentially driven between zero volts and 5 volts. During bus idle time, the state of bus line 12 is determined by termination resistor 46 coupled to $V_{cc}$, preferably 5 volts. Similarly, the idle state of bus line 14 is determined by termination resistor 48 coupled to ground. In this manner, the complementary or differential relationship between bus lines 12 and 14 is maintained when the bus lines are not being driven.

Clamping circuit 50, preferably a conventional zener diode clamp, clamps the voltage excursion on bus line 12 to a range of 5 volts to 1.67 volts. Similarly, clamping circuit 52, preferably a conventional zener diode clamp, clamps the voltage excursion on bus line 14 to a range of zero volts to 3.33 volts.

Receiver or comparator 62, preferably having a feedback resistor (not shown) for providing a desired level of hysteresis (plus or minus 200 mv), is shown having a positive input coupled to reference generator 64 and a negative input coupled to bus line 12. Reference generator 64 provides a reference voltage $V_1$ of approximately 3.33 volts which is the midpoint of the expected voltage excursion on clamped bus line 12.

Similarly, receiver or comparator 66, preferably having a feedback resistor (not shown) for providing a desired level of hysteresis (plus or minus 200 mv), is shown having a negative input coupled to reference generator 68 and a positive input coupled to bus line 14. Reference generator 68 provides a reference voltage $V_2$ of approximately 1.67 volts which is the midpoint of the expected voltage excursion on clamped bus line 14.

Differential comparator 70, preferably having a feedback resistor (not shown) for providing the desired level of hysteresis, is shown having a negative input terminal coupled to bus line 12 and a positive input terminal coupled to bus line 14. Differential comparator 70 acts as a differential receiver wherein all noise within the common mode range of differential comparator 70 is rejected. Accordingly, it is preferbble to use the received data from differential comparator 70 unless a system fault occurs as described in greater detail hereinafter.

The data output of comparator 62, hereinafter referred to as channel A (CA), is shown coupled to both start-of-message detector 74 and receiver selector 78. In a similar manner, the data output of comparator 66, hereinafter referred to as channel B (CB), and differential comparator 70, hereinafter referred to as channel D (CD), are each shown coupled to both start-of-message detector 74 and receiver selector 78.

As described in greater detail hereinafter, start-of-message detector 74 detects whether there is a correct start-of-message on channel A, channel B, and channel D. In response to the start-of-message detection, system fault decoder 82 determines whether there is a fault in either bus line 12, bus line 14, or module 10. System fault decoder 82 also determines the nature of the fault. Dependent upon the output of system fault decoder 82, receiver selector 78 couples the appropriate channel to data decoder 86.

Referring to FIGS. 3A, 3B and 3C, the data to be decoded is preferably in pulse width modulated form. More specifically, a logic 0 data bit comprises three subbits wherein the first two subbits are at a high voltage level (5 volts) and the third subbit is at a low voltage level (0 volts). A logic one data bit is defined by a subbit at a high voltage level followed by two subbits at a low voltage level as shown in FIG. 3B. The start-of-message, however, is not defined by the above described data bits. Consequently, the start-of-message may be accurately distinguished from the information which follows. As shown in FIG. 3C, the start-of-message is defined by four subbits at a high voltage level followed by two subbits at a low voltage level.

In the above-described pulse width modulated scheme, each data bit and start-of-message has a single rising edge. Thus, the sample timing required in start-of-message detector 74 and data decoder 86 is easily derived from, and synchronized to, the received data in a conventional manner. Consequently, there is no need to transmit a separate clock or synchronizing signal along with the data.

A more detailed description of the start-of-message detection, system fault decoding, and data channel selection is now provided, with particular reference to FIG. 4 and the associated wave forms presented in FIG. 5. Start-of-message detector 74 is shown having three start-of-message decoders 88, 90 and 92 coupled to channel A, channel D, and channel B, respectively. Start-of-message decoder 88 is shown including decoding logic or decoder 94 which is sampled during the midpoint of each subbit by sample timing 96. Rising edge detector or timing sync 98 is shown for aligning sample timing generator 96 to the time sequence of information on channel A. Similarly, start-of-message decoder 90 includes decoder 104, sample timing generator 106, and sync 108. Start-of-message decoder 92 includes decoder 114, sample timing generator 116, and sync 118.

Decoders 94, 104 and 114 each provide an open window indication to OR gate 120 during the fifth sample timing pulse and they also provide a close window indication to OR gate 122 a predetermined time thereafter. OR gates 120 and 122 are coupled to SR flip-flop 124 for generating a detector window time period for clocking or latching flip-flops 126, 128 and 130, respectively. Each of the decoders 94, 104 and 114 provides a prequalified start-of-message signal to the D inputs of flip-flops 126, 128 and 130, respectively, when five of the six subbits of a start-of-message are detected on respective channel A, channel D, and channel B. Accordingly, the prequalified start-of-message signal for each channel is stored in respective flip-flops 126, 128 and 130 during the detector window.

It is desirable to detect a start-of-message independently on each of the channels since the variance in time delays of each transmitter and each receiver results in timing "skew" between the received channels. It is also desirable to provide the prequalified start-of-message indication before the start-of-message ends, such that the appropriate channel may be coupled to data decoder 86 before the data message immediately following the start-of-message begins. For these reasons, individual decoders and associated sample timing are provided as described hereinabove to independently detect the start-of-message on each channel.

Referring particularly to FIG. 5, the wave forms associated with the above described start-of-message detection are shown for a case wherein there are no system failures. The start-of-message for channel A, channel D, channel B, and their associated sample timing, are shown skewed in time for illustrative purposes. For the time skew shown, the detector window is initiated on the fifth sample pulse of channel D. During the detector window, the prequalified start-of-message is latched or stored for each of the channels. Since there is no indication of a system failure, and channel D provides noise rejection, channel D is coupled to data decoder 86 by receiver selector 78 and system fault decoder 82 (FIG. 1).

The operation of receiver selector 78 and system fault decoder 82 are summarized in the following table.

TABLE

| CA | CD | CB | Select | System Fault Indication |
|---|---|---|---|---|
| S | O | O | CA | Bus line 14 (stuck passive) |
| O | S | O | CD | Receiving Module |
| S | S | O | CA | Bus line 14 (stuck active) |
| O | O | S | CB | Bus line 12 (stuck passive) |
| S | O | S | CA or CB | Receiving Module |
| O | S | S | CB | Bus line 12 (stuck active) |
| S | S | S | CD | No fault |
| O | O | O | No change | No fault |

Referring to the table, an S indicates that a valid prequalified start-of-message has been detected in the designated channel by start-of-message detector 74. A zero indicates that a start-of-message has not been detected. By conventional decoding logic, the specific system fault indication is provided by system fault decoder 82. For example, in the event that bus line 14 is stuck in the passive state, such as during an open circuit, the positive input to comparator 66 and the positive input to differential comparator 70 are both at approximately zero volts. The outputs of both comparator 66 and differential comparator 70 are then both stuck in a low voltage state. Associated start-of-message decoder 92 and 90 therefore do not detect a start-of-message. Accordingly, as shown in the first line of the fault table, system fault decoder 82 indicates that a system fault has occurred on bus line 14 and, more specifically, that bus line 14 is stuck in the passive state. As a further example, in the event that bus line 14 is stuck in the active state, clamping circuit 52 maintains both the positive input to comparator 66 and the positive input to differential comparator 70 at approximately 3.33 volts. Comparator 66 is then stuck in the high voltage state. Differential comparator 70, however, is able to switch between high and low voltage states depending uoon the information received on bus line 12. Accordingly, as shown in line 3 of the fault table, system fault decoder 82 provides the system fault indication that bus line 14 is stuck in the active state such as in the event that bus line 14 is shorted to the automobile's battery.

The system fault indication from system fault decoder 82 is preferably transmitted via system control processor 24 and transmitters 28 and 32 on bus lines 12 and 14. This information may then be utilized on a fault dashboard display (not shown) or as an input to diagnostic equipment in a garage setting. The output of system fault decoder 82 also determines which of the channels, CA, CB or CD, that receiver selector 78 couples to data decoder 86 as previously described herein and summarized in the fault table.

This concludes the description of the preferred embodiment. The reading of it by those skilled in the art will bring to mind many alterations and modifications without departing from the spirit and scope of the invention. For example, the data format described herein may be practiced with a data format which is different from that described hereinabove. Accordingly, it is intended that the scope of the invention be limited only by the following claims.

We claim:

1. A method for communicating data between communications modules, comprising the steps of:
   transmitting data from a first one of said modules;
   transmitting complementary data from said first module, said transmitted complementary data being the complement of said transmitted data;
   receiving the transmitted data in a second one of said modules, said transmitted data being received in a first channel of said second module;
   receiving the transmitted complementary data in said second module, said transmitted complementary data being received in a second channel of said second module;
   combining the transmitted data and the transmitted complementary data in said second module, the transmitted data and the transmitted complementary data being combined in a third channel of said second module;
   detecting a predetermined data sequence in said first channel and said second channel and said third channel;
   providing an indication of a communication fault based upon said detecting step; and
   selecting data from either said first channel or said second channel or said third channel based upon said fault indication.

2. A multiplex wiring system, comprising:
   transmitting means for transmitting data on a first bus and for transmitting complementary data on a second bus, the complementary data being the complement of the data transmitted on said first bus;
   first receiver means coupled to said first bus;
   second receiver means coupled to said second bus;
   differential receiver means coupled to both said first bus and said second bus for differentially combining the data and the complementary data;
   detector means for detecting a predetermined data sequence in said first receiver means and said second receiver means and said differential receiver means;
   decoder means coupled to said detector means for providing an indication of a fault in said multiplex wiring system; and data selector means responsive to said decoder means for selecting data from either said first receiver means or said second receiver means or said differential receiver means based upon said fault indication.

3. A multiplex wiring system, comprising:

a first bus;

a second bus;

a plurality of communication modules each having a transmitting means for transmitting data on said first bus and for transmitting complementary data on said second bus, the complementary data being the complement of the data transmitted on said first bus;

a plurality of first receiver means each one being positioned in each one of said modules and coupled to said first bus;

a plurality of second receiver means each one being positioned in each one of said modules and coupled to said second bus;

a plurality of differential receiver means each one being positioned in each one of said modules and coupled to both said first bus and said second bus for differentially combining the data and the complementary data;

a plurality of detector means each one being positioned in each one of said modules for detecting a predetermined data sequence in said first receiver means and said second receiver means and said diversity receiver means;

a plurality of decoder means each one being positioned in each one of said modules and coupled to said detector means for providing an indication of a fault in said communication system; and a plurality of data selector means each one being positioned in each one of said modules and responsive to said decoder means for selecting data from either said first receiver means or said second receiver means or said differential receiver means based upon said fault indication.

4. The multiplex wiring system recited in claim 3 wherein said predetermined data sequence comprises a start-of-message.

5. The multiplex wiring system recited in claim 4 wherein said start-of-message comprises six subbits of data.

6. The multiplex wiring system recited in claim 5 wherein said detector means detects the first five of said six subbits.

7. The multiplex wiring system recited in claim 3 wherein said first bus and said second bus comprise a twisted wire pair.

8. The multiplex wiring system recited in claim 3 wherein each of said modules further comprises:

an input port coupled to at least one automobile accessory switch;

processor means coupled to said input port for receiving information from said automobile accessory switch; and control means coupled to said processor means and said transmitter means for transmitting data based upon said information received from said automobile accessory switch.

9. The multiplex wiring system recited in claim 8 wherein each of said modules further comprises an output port adapted for coupling with an automobile accessory.

10. The multiplex wiring system recited in claim 9 wherein said control means is also coupled to said data selector means for receiving said selected data.

11. The multiplex wiring system recited in claim 10 wherein said processor means also couples information through said output port to said automobile accessory based upon said selected data received from said data selector means.

* * * * *